US011083175B2

(12) United States Patent
Pannell

(10) Patent No.: US 11,083,175 B2
(45) Date of Patent: Aug. 10, 2021

(54) SHELLFISH GROWING APPARATUS, SYSTEM AND METHOD OF USING SAME

(71) Applicant: MARLBOROUGH OYSTERS LIMITED, Hamilton (NZ)

(72) Inventor: Aaron Peter Pannell, Hamilton (NZ)

(73) Assignee: MARLBOROUGH OYSTERS LIMITED, Hamilton (NZ)

( * ) Notice: Subject to any disclaimer, the term of this patent is extended or adjusted under 35 U.S.C. 154(b) by 0 days.

(21) Appl. No.: 16/966,964

(22) PCT Filed: Jan. 31, 2019

(86) PCT No.: PCT/NZ2019/050007
§ 371 (c)(1),
(2) Date: Aug. 3, 2020

(87) PCT Pub. No.: WO2019/151879
PCT Pub. Date: Aug. 8, 2019

(65) Prior Publication Data
US 2021/0000085 A1    Jan. 7, 2021

(30) Foreign Application Priority Data

Feb. 2, 2018  (NZ) ........................................ 739638

(51) Int. Cl.
*A01K 61/55* (2017.01)
(52) U.S. Cl.
CPC .................................. *A01K 61/55* (2017.01)
(58) Field of Classification Search
CPC ........ A01K 61/60; A01K 61/10; A01K 61/54; A01K 61/59; A01K 61/00; A01K 97/20;
(Continued)

(56) References Cited

U.S. PATENT DOCUMENTS 3,909,971 A * 10/1975 Wilde .................... A01K 61/54
                                                          43/6.5
4,170,197 A    10/1979 Walker
(Continued)

FOREIGN PATENT DOCUMENTS

AU        752344 B2     9/2002
CN       2240242 Y     11/1996
(Continued)

OTHER PUBLICATIONS

Zapco Aquaculture Zapco: ZAP010-2 [retrieved from Internet on Aug. 3, 2020] <URL: https://web.archive.org/web/20100912034026/http:/www.zapcoaquaculture.com/products/show/id/155> published on Sep. 12, 2010 as per Wayback Machine Image.
(Continued)

*Primary Examiner* — Timothy D Collins
*Assistant Examiner* — Brittany A Lowery
(74) *Attorney, Agent, or Firm* — Pilloff Passino & Cosenza LLP; Martin J. Cosenza

(57) ABSTRACT

The system, apparatus and method of the present invention provides for the cultivation of shellfish in subtidal environments. A key aspect of the invention is the use of specially configured baskets, into which the shellfish to be grown is seeded. In particular, the baskets are configured with a support bracket through which a cable passes. The mounting of the support bracket permits the rotation of the basket and allows a shellfish cultivator to replicate the growing conditions of intertidal ecosystems despite the invention being used in a subtidal environment.

20 Claims, 6 Drawing Sheets

(58) Field of Classification Search
CPC ...... A01K 97/05; A01K 67/033; A01K 61/55;
A01K 69/10; A01K 61/50
See application file for complete search history.

(56) References Cited

U.S. PATENT DOCUMENTS

| | | | |
|---|---|---|---|
| 4,351,268 A * | 9/1982 | Blair | A01K 61/10 |
| | | | 119/223 |
| 4,704,990 A | 11/1987 | Moxham | |
| 10,653,119 B2 * | 5/2020 | Goudey | A01K 61/55 |
| 2017/0215390 A1 | 8/2017 | Jack et al. | |
| 2019/0200582 A1 | 7/2019 | Horzesky et al. | |

FOREIGN PATENT DOCUMENTS

| | | |
|---|---|---|
| CN | 204070056 U | 1/2015 |
| FR | 2900027 A1 | 10/2007 |
| NZ | 328983 A | 6/2000 |
| WO | 0158254 A1 | 8/2001 |

OTHER PUBLICATIONS

International Search Report & Written Opinion for PCT/NZ2019/050007, dated Mar. 28, 2019.
Third Party Observation & Comments filed in PCT/NZ2019/050007 dated Sep. 30, 2019.
International Preliminary Report on Patentability for PCT/NZ2019/050007, dated Oct. 21, 2019.

* cited by examiner

SHELLFISH GROWING APPARATUS, SYSTEM AND METHOD OF USING SAME

FIELD OF INVENTION

The present invention relates to a shellfish growing system for the cultivation and harvesting of shellfish, such as oysters. The present invention may have particular application to "single seed" growing methods, particularly in subtidal (i.e. offshore) locations.

BACKGROUND TO THE INVENTION

Shellfish can be cultivated in a number of ways. One technique that may be used is "single seed" growing systems wherein the shellfish spat is contained relatively freely within holding containers, such as baskets or bags, to grow to maturity and/or a harvestable size. It is generally considered that single seed systems tend to produce higher quality shellfish than techniques involving attachment of shellfish spats to a growing medium, which is another cultivation technique often used.

Shellfish single seed growing systems may be either subtidal or intertidal.

In subtidal systems, the shellfish remain submerged underwater within their holding containers and are not exposed above the surface during the growing process. Subtidal growing systems tend to be established in relatively deep water farther from shore.

By contrast, intertidal systems are typically established in shallow water close to shore. As the tides change, the holding containers hosting the shellfish are alternately submerged underwater and exposed to air.

Subtidal and intertidal growing systems each have advantages and drawbacks.

Subtidal systems may take advantage of relatively inexpensive farming locations, remote from shore, as well as cheaper growing infrastructure and access to the farming site independently of tides. They may also enable faster growth of shellfish.

However, subtidal growing systems can encounter problems with poor shell growth and shell shape as a result of being constantly immersed and not handled frequently. Furthermore, being remote from shore, such systems may risk damage both to equipment and to the shellfish being cultivated due to climactic events (such as storms and heavy seas), issues with biofouling, and bird predation.

Intertidal systems generally yield shellfish having a harder shell, better adductor strength (which can result in longer shelf life) and better overall conditioning. This is likely to be due to the shellfish being alternately submerged and exposed to air, prompting behavioural responses (such as adductor muscle activity) as well as allowing the shells to dry out when elevated from the water, which may mitigate biofouling. Intertidal systems may also have fewer issues with biofouling and less risk of damage to growing infrastructure as a result of wave action.

However, suitable locations, such as estuarine areas, for establishing intertidal systems may be at a premium and thus both more expensive and more difficult to secure. Growing infrastructure may be more expensive to install since the shellfish is ideally kept above the substrate even at low tide. Access to intertidal systems may also be limited by tidal movements, and harvesting is more likely to be affected by rainfall.

A common configuration for single-seed shellfish cultivation is known as the "adjustable longline system". For intertidal environments, the system comprises a plurality of substantially cylindrical baskets that may be openable at one or both ends. Each basket includes clips for attachment to one or more elongate cables or ropes that are strung across the intended farming region.

In use, the baskets are clipped onto the line in "single file" formation, such that the line extends parallel to the elongate dimension of the baskets.

In some adjustable longline systems particularly adapted for use in subtidal environments, the baskets (or alternatively bags) may include floats or buoyancy aids proximate the top of the basket, such that, in use, the basket or bag is submerged while being maintained proximate the water's surface by the buoyancy aid. Adjustable longline systems, in both subtidal and intertidal environments, may include this feature. In the case of intertidal systems, the inclusion of a buoyancy aid can cause additional movement of the basket with the rise and fall of the tide, which may help to shape the growing oysters.

During the single-seed growing process, shellfish within the baskets tend to grow at an unequal rate. This is often due to individual shellfish being exposed to differing degrees of water-flow depending on their position in the basket.

The shellfish must therefore be periodically graded during the farming process. This involves removing the shellfish from the basket and passing them through a "grader" to separate them into groups of similar size. The grouped shellfish are then returned to the baskets and the growing process resumes. Grading may often be repeated several times prior to the final harvest.

The configuration of conventional single-seed growing systems, including the adjustable longline system, typically precludes removal of shellfish from the baskets while in situ. Due to the significant amount of space required to accommodate the baskets, grading is therefore typically performed at an onshore location rather than onboard a vessel. As such, the laden baskets must be detached and transported to another site for grading.

Furthermore, the baskets are usually treated for biofouling simultaneously with grading taking place. This requires that the baskets be placed out of the water and allowed to dry for a period of time.

Once again, the significant storage space this necessitates means this is typically done at the onshore location.

Following grading and biofouling treatment, the baskets are refilled with the graded shellfish and are transported back to the farming location and reattached to the line for the growing process to continue. This is often repeated multiple times prior to the final harvest.

Conventional farming processes therefore can potentially require significant transportation of the shellfish and baskets multiple times during the growing process, as well as manual labour often involving intensive physical exertion such as repetitive heavy lifting. The inventor estimates that labour costs account for approximately one third to one half of the overall cost of conventional single-seed shellfish farming.

It is an object of the present invention to address the foregoing problems with the prior art, or at the very least to provide the public with a useful choice.

All references, including any patents or patent applications that may be cited in this specification are hereby incorporated by reference. No admission is made that any such reference constitutes prior art. The discussion of the references states what their authors assert, and the applicants reserve the right to challenge the accuracy and pertinency of the cited documents. It will be clearly understood that, although a number of prior art publications may be referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

It is an object of the present invention to address the foregoing problems or at the very least to provide the public with a useful choice.

DISCLOSURE OF THE INVENTION

According to one aspect of the invention, there is provided a basket for cultivation of shellfish, wherein the basket has an elongate dimension and includes:
one or more support brackets for one or more cables, wherein each bracket is orientated along an axis substantially perpendicular to the elongate dimension of the basket, wherein the one or more brackets define an axis of rotation disposed substantially midway along the elongate dimension of the basket; and
a buoyancy module.

According to one aspect of the invention, there is provided a system for cultivation of shellfish, the system including:
one or more cables; and
at least one basket, wherein the basket has an elongate dimension and includes one or more support brackets for the one or more cables, wherein each support bracket is orientated along an axis substantially perpendicular to the elongate dimension of the basket, wherein the one or more brackets define an axis of rotation disposed substantially midway along the elongate dimension of the basket; and wherein the basket includes a buoyancy module.

According to another aspect of the invention, there is provided a method of using a system for growing shellfish substantially as described above, the method including the steps of:
a) passing a cable through each of the one or more support brackets of at least one basket; and
b) immersing the basket in a marine or freshwater environment.

According to another aspect of the present invention, there is a method substantially as described above, the method including the additional step of:
c) raising the cable such that the basket rotates about the axis of rotation defined by the one or more support brackets.

The system, apparatus and method of the present invention provides for the cultivation of shellfish in subtidal environments. The quality of the shellfish cultivated with the present invention may be similar or superior to those cultivated in intertidal environments, which historically provide optimal growing conditions for shellfish.

The invention should be understood to be for use in the cultivation of shellfish. Although reference is made to the cultivation of shellfish taking place in a marine environment, i.e. used with marine species of shellfish, it will be understood that the invention may also be used with freshwater species of shellfish.

In exemplary embodiments of the invention, the shellfish are oysters and reference to this effect shall be made throughout the remainder of the present specification. However, this is not meant to be limiting and the invention may be used for cultivation of other shellfish such as scallops or mussels.

A basket is used in the present invention for cultivation of the oysters. Such baskets provide a cultivation surface on which young oysters, known as spats, may position themselves.

The basket should be understood to be a substantially enclosed structure having a top, bottom, left and right sides, and front and rear ends. The sides of the basket are mesh-like or otherwise provided with apertures to allow water to enter the basket.

The mesh is dimensioned or sized such that the oysters to be contained by the basket are not allowed to escape. However, in most embodiments, the oysters remain free to move within the basket. This allows them to move to favourable positions for feeding and optimising growth. In some embodiments, the basket may be provided with growing surfaces, such as racks or the like, on which oyster spats may be "seeded" or otherwise attach themselves to.

Baskets may be provided with a range of mesh sizes, depending on the relative maturity of the oysters contained therein. For example, baskets in which spats are seeded may have a relatively fine mesh. Once the spats have grown to a larger size, they may be graded and transferred to another basket having a coarser mesh.

The front and/or rear ends of the basket should be understood to be configured to allow access to the interior of the basket. This will be achieved in a number of ways readily apparent to persons skilled in the art; for example, the front and/or rear ends may be configured as flaps, with one edge hingedly mounted to the basket such that it can be opened and closed. A locking mechanism may be present ensure that the basket is not accidentally opened.

Reference to top should be understood to mean the uppermost side of the basket when it is immersed in the water. The bottom, or lowermost side, of the basket is the opposing side, and will be understood to be substantially facing the seabed when immersed in the water.

The baskets are configured to be used with cables or wire ropes from which they are supported. A series of baskets may be connected to the cable which runs substantially perpendicular to the elongate dimension of the basket.

Persons skilled in the art will readily appreciate cables that would be appropriate for use in the present invention. Preferably plastic ropes made of material such as polypropylene are used. The ropes may be UV treated to reduce them being affected by UV rays emitted by the sun. To minimise risk of stretching, ropes with a relatively large diameter are preferred.

Alternatively, given the environment in which the invention is to be operated, corrosion resistant metal cables may be used since they would be unlikely to be affected by UV rays from the sun. Metal cables would also be less likely to suffer stretching over time. However, metal cables may be more expensive to source.

The bottom side of the basket is provided with at least one support bracket. This is mounted to the basket such that it forms an axis which is substantially perpendicular to the elongate dimension of the basket.

The support bracket should be understood to be a structure through which the cable may pass. In use, the basket is able to rotate about the axis of rotation defined by the support bracket. It will be appreciated from that the diameter of the cable ultimately used with the present invention may be dependent on the size of the support bracket.

The support bracket is disposed substantially midway along the elongate dimension of the basket. This is useful, for it means that the basket is able to rotate at least 180° relatively easily. If the mounting of the support bracket was such the axis of rotation was closer to one or the other end of the basket, then a greater amount of force will be required for it to rotate at least 180°. The amount of clearance for the basket to achieve a full revolution would also be greater.

Although reference is made throughout the remainder of the specification to the use of one support bracket for the basket, in some embodiments, the basket may be provided with two (or more) support brackets. It will be understood that this means that two (or more) cables may be used with the baskets. In these embodiments, the brackets will be positioned substantially equi-distance from each end of the elongate dimension of the basket. The axis of rotation will be therefore be defined by a line substantially midway between the support brackets and thus the baskets can still rotate at least 180° relatively easily.

The support bracket may simply be a cylindrical pipe through which the cable passes. The pipe may be made of a suitable material such as heavy duty plastics or a coated metal. The use of a pipe means that the contact surface which, as the baskets rotate becomes a bearing surface between the cable and pipe, is as large as possible. It will be appreciated that rather than a single length of pipe, two or more shorter lengths could be used to the same effect.

Alternatively, the support bracket may be a two-part structure which together form a tube-like structure through which the cable may pass. In this embodiment, one part may be attached to or even integrally moulded as part of the basket, with the other part attached to it and secured using screws or the like.

The support bracket is secured to the basket through appropriate fasteners such as nuts and bolts, rivets, clips or the like. Persons skilled in the art will readily appreciate other means by which the support bracket may be affixed or otherwise secured to the basket.

In exemplary embodiments of the invention, the support bracket spans at least the width of the basket, if not more. Having a span greater than the width of the basket is useful, for the support bracket can then be used as a spacer between adjacent baskets in use, to prevent or reduce any contact between them.

Alternatively, the support bracket may be two or more spaced apart hasps or loops affixed to the bottom side of the basket. In this embodiment, it will be appreciated that the support bracket may not be greater than the width dimension of the basket.

Persons skilled in the art will appreciate other structures that may be used on or in the bottom side of the basket to achieve an axis of rotation that is substantially perpendicular to its elongate dimension. Regardless, it will be appreciated that once loaded and in use, the baskets will be of considerable weight and exposed to environmental wear and robust handling. As such, the support bracket will need to be engineered accordingly.

The basket includes a buoyancy module.

The buoyancy module should be understood to be a component or structure that is configured to be buoyant.

In one exemplary embodiment of the invention, the buoyancy module is a block, or plurality of blocks, of closed cell foam, such as polystyrene or the like. For structural integrity, the block may be encased or otherwise coated with one or more layers of plastics material.

In another embodiment of the invention, the buoyancy module may be a rotationally moulded container or the like.

It will be understood that when sealed with a cap or the like, the air within the container provides the buoyancy.

It will be appreciated that it could be useful to control the degree of buoyancy of such a module. For example, if a major weather event such as a storm is likely to occur, the operator of the system may opt to admit water into the buoyancy module such that it, and the basket, sinks to the substrate. This reduces the risk of damage to the equipment. The same approach may be used if there is a risk of ice formation.

Therefore, the cap of the buoyancy module may be configured to be quickly removable to permit entry of water into the module.

In some other embodiments, the buoyancy module may include electronically controlled valves or the like which permit entry of water to the module and which may provide a degree of control of the extent of the buoyancy provided by the module. Greater control of the buoyancy may also be achieved through the use of pumps or the like, which are operable to move water in and out of the buoyancy module to adjust its buoyancy.

In exemplary embodiments, the buoyancy module will be understood to be configured to engage with the upper side of the basket, i.e. the opposing side to that to which the support bracket is mounted. In these embodiments, the buoyancy provided by the buoyancy module may assist in the rotation of the baskets. However, in other embodiments, the buoyancy module may be configured to engage with the lower side of the basket. It will be appreciated that in this embodiment, provisions will need to be made to ensure the support bracket and cable are not unduly inhibited from functioning because of the presence of the buoyancy module. For example, the buoyancy module may be moulded or otherwise formed with appropriate recesses or channels for the support bracket and cable.

The engagement between the basket and buoyancy module may be achieved in a number of ways.

For example, the basket may be configured with an appropriately shaped recess into which the buoyancy module is located. Straps or fasteners may be used to secure the buoyancy module into the recess. Alternatively, the buoyancy module may be provided with recesses or apertures about its perimeter into which straps may be passed and secured to the base of the basket. In some embodiments, the buoyancy module may be configured with clips, split-pins, or similar snap-lock fittings to engage with the basket. Alternatively, plastics screws or the like may be used to secure the buoyancy module to the baskets.

Persons skilled in the art will readily appreciate other ways in which the buoyancy modules and baskets may be configured to allow them to engage with each other. Indeed, in some embodiments the baskets may be manufactured such that it and the buoyancy module is an integrated structure.

In use, a plurality of baskets are positioned such that a cable can be run through the support brackets. The baskets are then lowered into the sea, orientated such that the buoyancy modules face upwards.

At either end, the cable is secured, either by an anchor or, depending on the area in which the invention is to be used, to poles, buoys, or moorings. This allows the present invention to be used in seawater of any depth.

Oyster spats may be introduced to the baskets before they are placed in the sea or more preferably afterwards, once the system has been positioned in the area in which it is to be used.

Placed such that the buoyancy module is uppermost, the basket is just below the surface of the sea. This fully immerses the oysters in the seawater, encouraging faster growth. The presence of the buoyancy module also protects the growing oysters from predating seabirds that may otherwise penetrate the mesh of the baskets and eat the oysters.

The basket is effectively suspended from the buoyancy module, floating on the surface of the sea, with the cable linking adjacent baskets hanging below it.

Through the use of appropriate handling equipment, for example a winch operated hook, a vessel can come alongside the cable and by lifting it out of the water, this facilitates the raising and, due to the weight of the basket, rotation of the baskets such that the bottom side of the basket, to which the support bracket is mounted, is uppermost.

For the purposes of collection or grading of the oysters, only one end of the basket needs to be manipulated or orientated to the vessel. The doors of the basket can then be opened and the oysters collected on the deck of the vessel, either for retrieval or for grading purposes.

There is no need for the entire basket to be lifted and located onto the deck of the vessel. This saving in handling means considerable space and labour reductions. There is no need to transport the baskets to shore for collection and grading.

Once graded, the oysters can put into an appropriate basket and returned to the sea.

The vessel will move along the line, raising and emptying the baskets as required. In the interim, the empty baskets, now floating on their buoyancy modules, are exposed to the air. This helps dry them out and minimise or control any fouling.

Alternatively, the raising and rotation of the baskets may be for the purpose of exposing the oysters and basket to the air for a period of time. By repeating this on a regular basis, this can simulate an intertidal growing environment even though the baskets are being used in a subtidal environment. Benefits of this could include improved shell hardness and better conditioning.

Once raised and rotated such that the bottom side is uppermost, the baskets can be lowered back to the sea surface. In this scenario, the baskets are supported on their buoyancy modules.

This process may be semi- or fully-automated; for example, through the use of a shuttle.

The shuttle may be configured in a number of ways to facilitate the rotation of the baskets. In one embodiment, the shuttle is positioned low in the water and is provided with a frame on its deck. The frame has ramps fore and after leading to the water.

The cable of the system for cultivation of shellfish should be understood to have sufficient slack such that one end can be lifted so that the shuttle may be positioned underneath before the cable is released such that it rests atop of the frame.

As the shuttle moves forward, along the line of the system, either through the use of a hauling line or being self-propelled, the baskets ride up the ramp and onto the frame. Workers on the shuttle can then access the oysters within the basket as required. In some embodiments, the frame may include a guide, rail or the like favouring one side of the basket that assists in the rotation and flipping of the baskets.

In another embodiment, the shuttle may be fully automated. In this embodiment, the shuttle may be configured such that it has a catamaran-type hull, which spans the line of baskets. A guide, rail or similar structure positioned between the hulls of the shuttle engages with a surface of the baskets and/or flotation modules, rotating them about the axis of rotation defined by the support brackets as the shuttle moves along the cable. In exemplary embodiments, the shuttle is double-ended, i.e. will be able to move up and down the cable of the cultivation system without needing to be re-orientated.

In this embodiment, the shuttle will be provided with a hauling line operable with a motor. The hauling line will be substantially in the same orientation as the cable of the system. The motor of the shuttle may be powered by electricity generated from an onboard battery, solar cell, or even wind power generator. An onboard CPU or PLC may be programmed for the shuttle to perform this action on a regular basis depending on the user's preferences.

The present invention provides a sub-tidal cultivation system that offers a number of advantages, including, but not limited to, the following:
- the ability to securely cultivate shellfish in a subtidal environment but with some of the benefits of intertidal cultivation systems;
- the ability to farm greater numbers of shellfish than may be achieved in intertidal environments;
- the ability to temporarily sink the cultivation system to the substrate to avoid climatic events such as hurricanes or ice and minimise risk of equipment damage;
- increased protection from bird predation;
- may be easier to collect and transport shellfish than existing subtidal or intertidal cultivation systems, with subsequent reduced costs in time and labour;
- may require less space on vessels for collection and grading of oysters, since the baskets can remain in situ;
- may allow for automation or semi-automation of the collection of shellfish, with subsequent reduced costs in time and labour.

At the very least, the present invention offers the public a useful choice.

Further aspects of the invention, which should be considered in all its novel aspects, will become apparent to those skilled in the art upon reading of the following description which provides at least one example of a practical application of the invention.

BRIEF DESCRIPTION OF FIGURES

One or more embodiments of the invention will be described below by way of example only, and without intending to be limiting, with reference to the following drawings, in which.

DETAILED DESCRIPTION OF FIGURES

Figure 1:
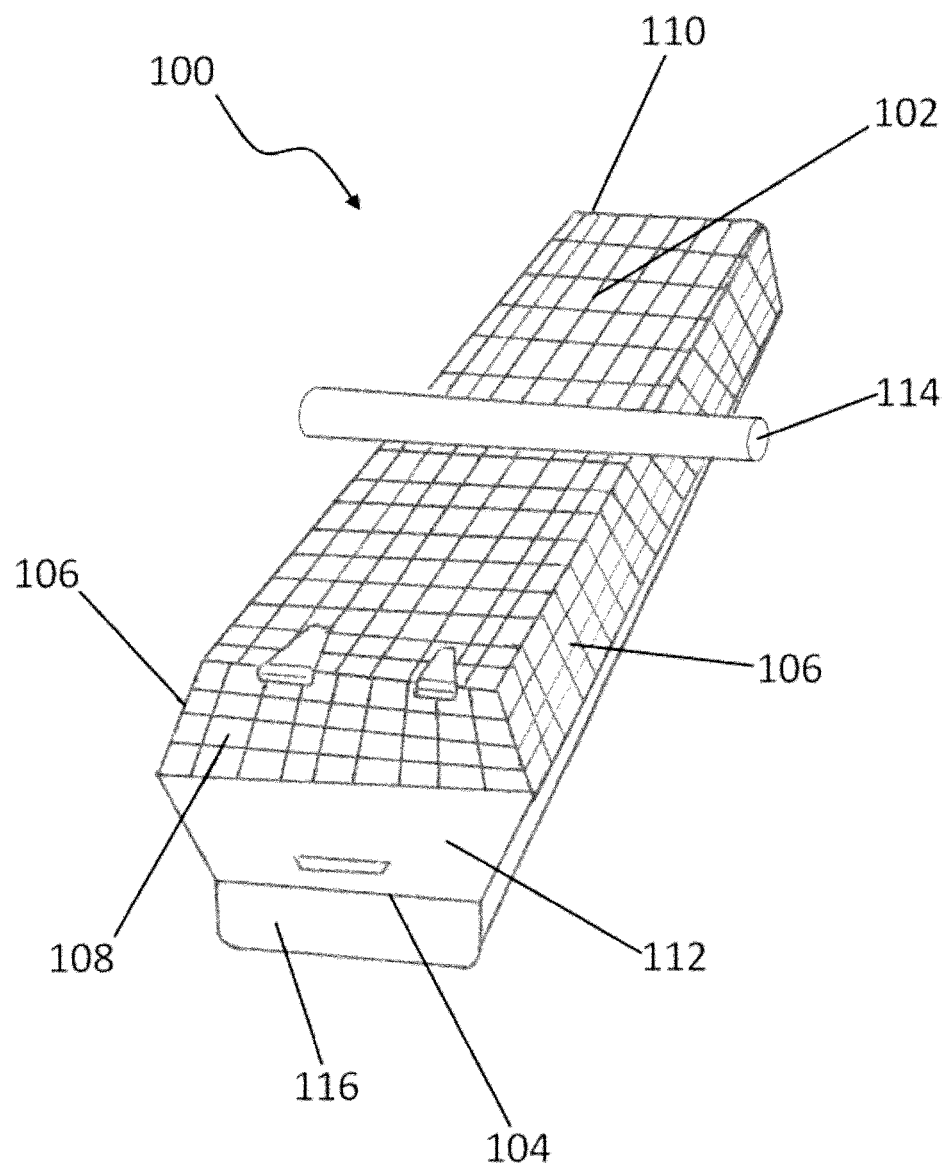
FIG. 1 is a perspective view of a basket of one exemplary embodiment of the present invention.

The basket of the present invention (generally indicated by arrow 100) is illustrated in FIG. 1. As can be seen, the basket, which is typically injection or rotationally moulded from plastics material, is substantially an elongate cylindrical structure.

In this view, the basket (100) is shown with its lower side (102) upper most; it also has an upper side (104), with sides (106) and front (108) and rear ends (110). The front and rear ends are configured with flap-like doors (112) permitting access to the interior of the basket.

The front (108) and rear ends (110) of the basket (100), as well as its remaining sides are substantially a mesh or lattice structure (not shown to scale). This permits flow of water through the basket to immerse the shellfish (not shown), for example oysters. The dimensions of the mesh is such that the oysters are not able to escape the basket. The oysters may be unconstrained within the basket or seeded on growing racks (not shown) therein.

Mounted to the lower side (102) of the basket (100) and spanning its width i.e. perpendicular to its length dimension, is a support bracket (114). In its simplest form, the support bracket is a length of pipe through which a cable (not shown) may pass. Effectively, the support bracket forms an axis of rotation for the basket.

It will be seen that the support bracket (114) has a length that is greater than the width of the basket (100). This means that when several baskets are arranged along a single cable (not shown), the support bracket provides a means of spacing each basket from the adjacent basket. The support brackets of adjacent baskets will contact and abut each other, rather than the baskets themselves.

Fixed to the upper side of the basket (100) is a buoyancy module (116); this is secured to the basket using straps (not shown) passing through the lattice structure of the sides of the basket.

Figure 2:
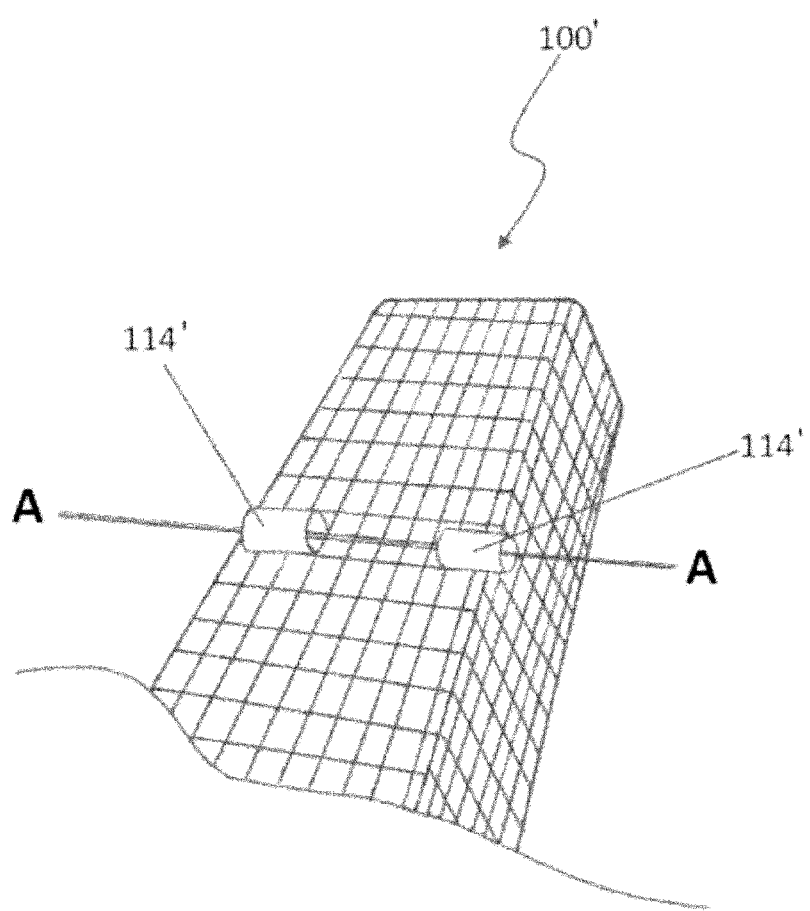
FIG. 2 is a perspective view of a basket of a further exemplary embodiment of the present invention.

An alternative support bracket (114') for the basket (100') is shown in FIG. 2; as can be seen, this is not a length of pipe but is instead a pair of loops through which a cable (not shown). The pair of loops define an axis of rotation, line A-A, for the basket.

Figure 3:
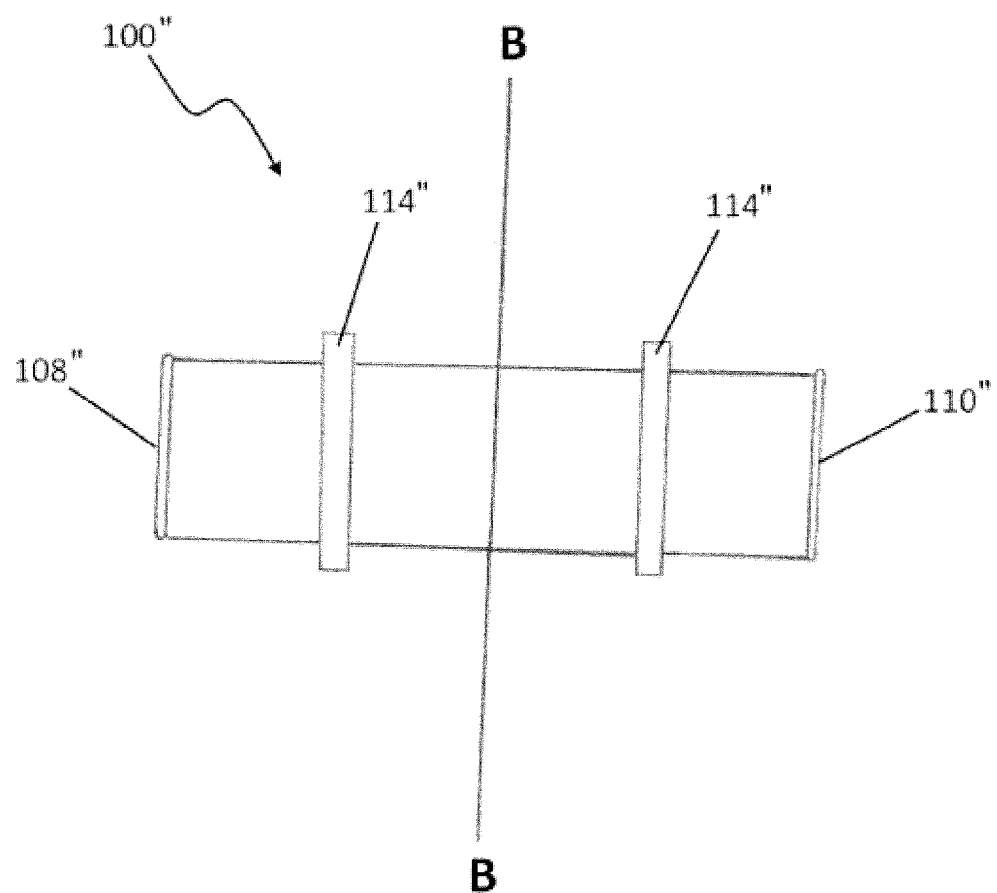
FIG. 3 is a top view of a basket of a further exemplary embodiment of the present invention.

A further embodiment of the basket (100") is shown in FIG. 3 in a top view (the lattice structure of its sides has been omitted for sake of clarity). This shows a pair of support brackets (114") positioned substantially an equal distance from the front (108") and rear ends (110") of the basket. A cable will pass through each support bracket; however, because of the relative positions of each support bracket, the axis of rotation for the basket is along line B-B. There is little or no increase in the footprint of the basket as it rotates compared to the footprint if only one of the illustrated support brackets had a cable passing through it.

Figure 4:
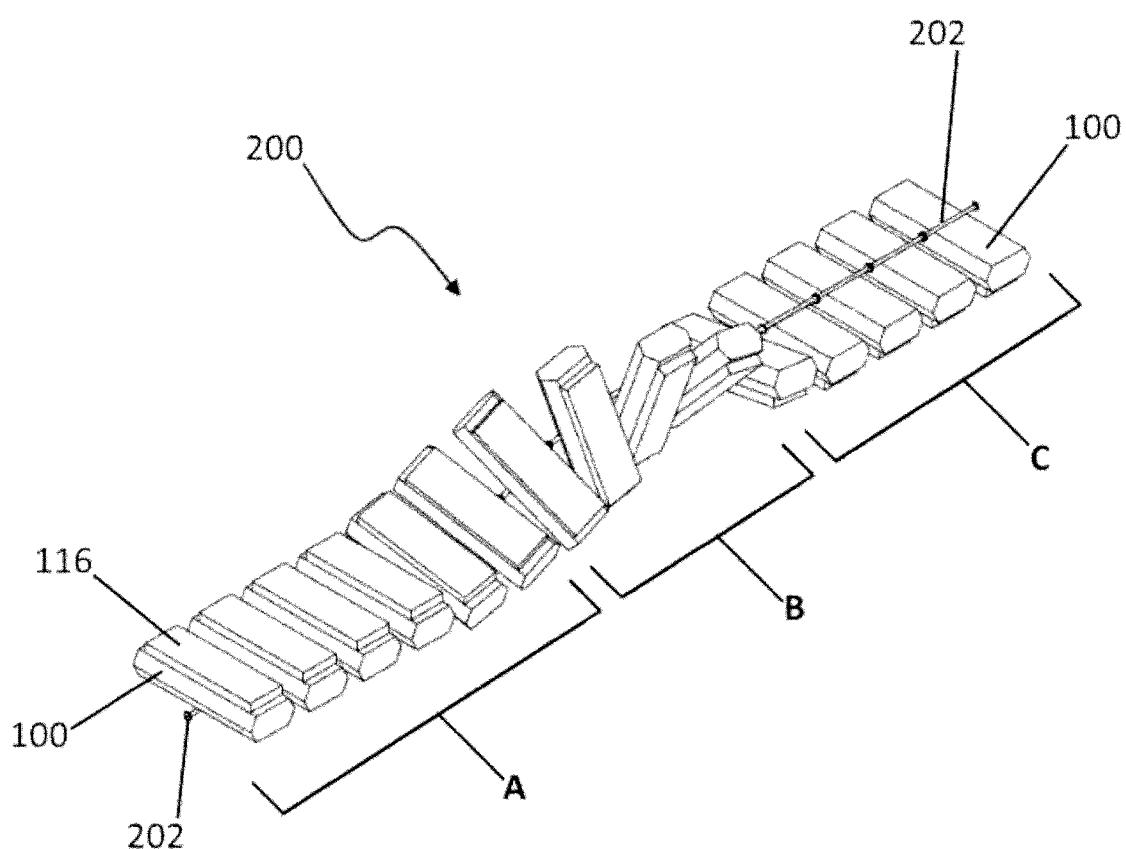
FIG. 4 is a perspective view of a schematic of one embodiment of the system of the present invention, using a plurality of baskets substantially as illustrated in FIG. 1.

Turning now to FIG. 4, this shows in a perspective view the cultivation system (200) of the present invention including a plurality of baskets (100) that have been mounted to a cable (202) via the support brackets (not visible). In this view, only 15 baskets are visible but it should be understood that many more (or less) may be used. As the system (200) is intended for sub-tidal environments, space is typically not a constraint (compared to an inter-tidal environment where land may be at a premium).

In FIG. 4, the baskets (100) positioned along the portion of the system (200) indicated by A are shown with the buoyancy module (116) uppermost. This is the typical growing position in which the basket hangs beneath the buoyancy module, fully immersing the oysters or shellfish being cultivated (not shown).

Along the portion of the system indicated by B, the baskets (100) are shown being rotated or flipped. This will be achieved through the use of semi- or fully-automated means (not shown).

Along portion C of the system, the baskets (100) have been flipped such that the baskets are uppermost. This flipping allows the oysters contained within these baskets to be retrieved, if so desired, and the baskets allowed to dry out or have maintenance performed thereupon.

Thus, the invention provides the operator of the system utilising the baskets the ability to mimic an intertidal cultivation system, in which the shellfish are periodically covered/uncovered by tidal action, despite being in a sub-tidal environment. The shellfish benefit as this can result in a harder shell, improved conditioning, and better abductor strength. The benefits to the consumer is improved shelf life and quality. This is achieved without the need for permanently fixed structures that would otherwise be dependent on the status of the tides for access.

Figure 5A:
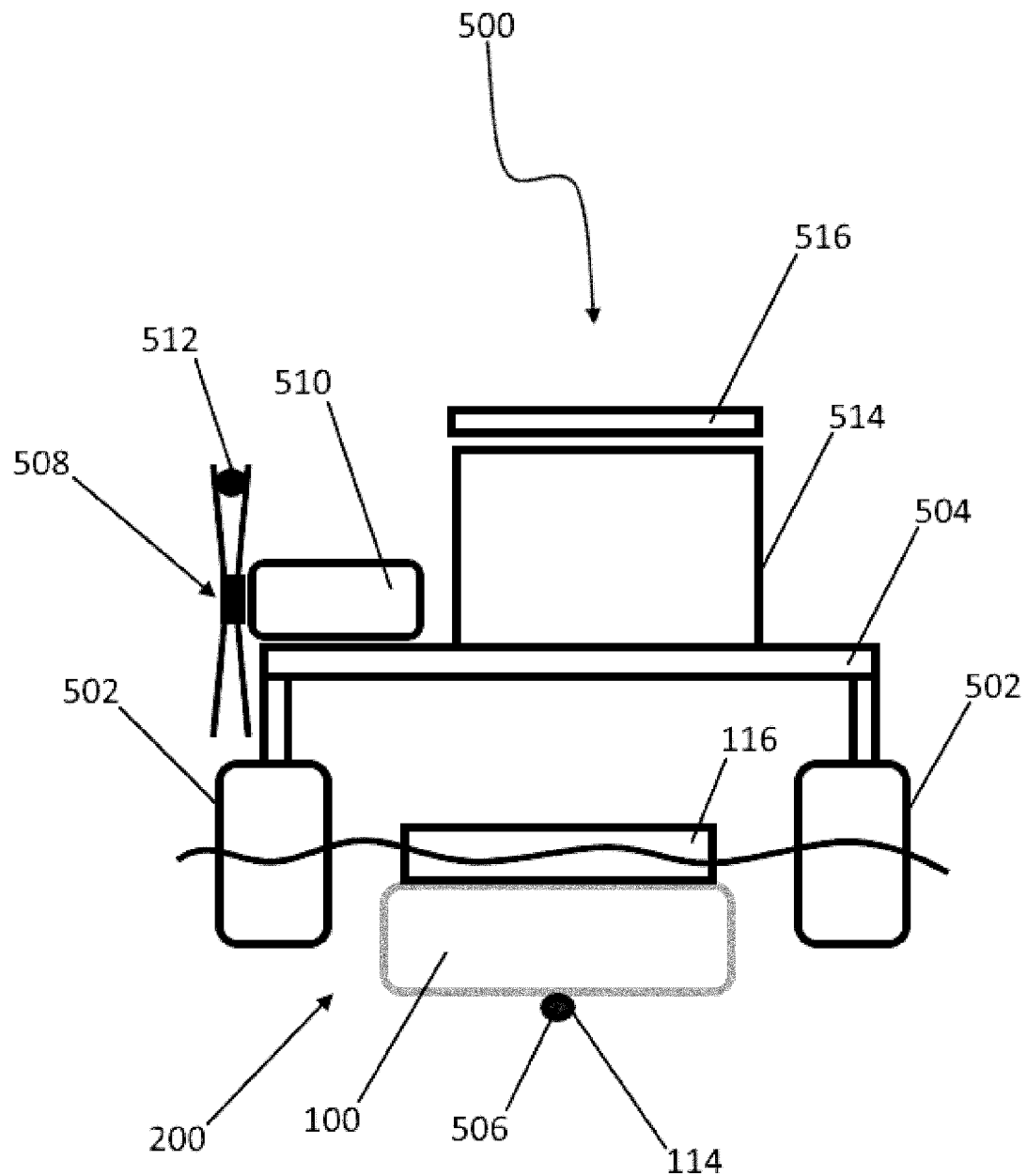
FIG. 5A is an end view of one embodiment of a shuttle for use with the system of the present invention.
Figure 5B:
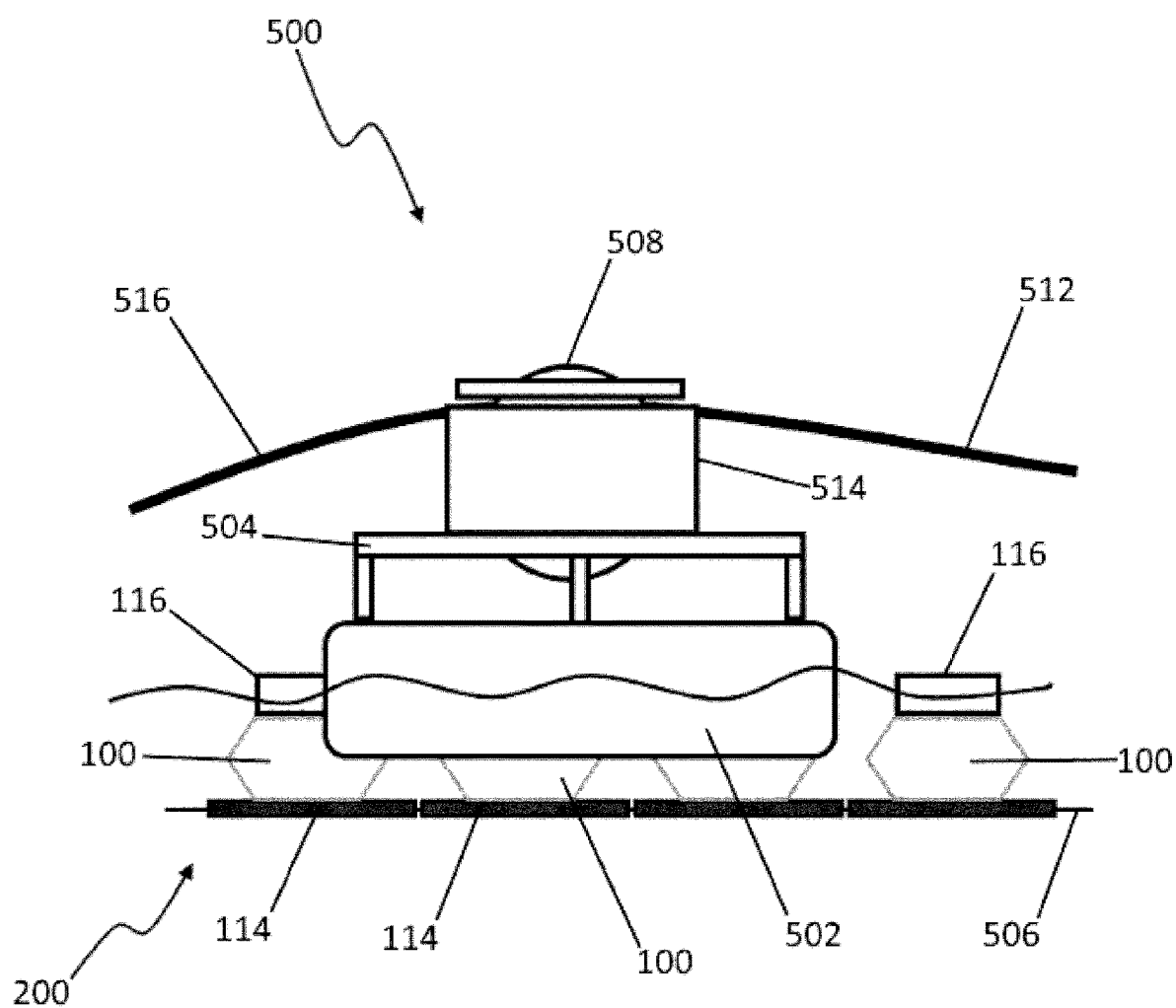
FIG. 5B is a side view of the shuttle of FIG. 5A.

FIGS. 5A and 5B shows a shuttle (500) that facilitates the automation of the rotation of the baskets (100) of the system of FIG. 1. Viewed from one end in FIG. 5A, it can be seen that the shuttle includes two hulls (502) connected to a top deck (504). The hulls span the cable (506) and the baskets and buoyancy modules (116) attached thereto. The wavy line indicates the water level so it will be appreciated that the baskets are suspended beneath the surface of the water with the cable (506) and support brackets (114) lowermost.

The shuttle (500) is provided with a line hauler (508) powered by a motor (510). This allows the shuttle to be pulled along a hauling line (512), which runs substantially along but is separate from, the cable (506) of the cultivation system. The motor is powered by electricity from an onboard battery (not shown) within a weatherproof compartment (514). The battery may be recharged via a solar panel (516), as shown here, but could be through the use of a wind power generator. In an embodiment not illustrated here, the battery could be recharged with mains power, with appropriate protection from electric shocks.

As seen in FIG. 5B, the shuttle (500) is substantially the same shape, fore and aft. This is to facilitate the movement of the shuttle along the cable (506) and hauling line (512) in both directions.

As the shuttle (500) progresses down the cultivation system (200) by virtue of the operation of the line hauler (508), spiral rails (not shown for sake of clarity) beneath the top deck (504) and water surface engage with the baskets (100) to flip them about the axis of rotation provided by the support bracket (114) so that instead of the buoyancy module (116) being uppermost as shown, the basket becomes exposed. An onboard controller (not shown) within the compartment (514) may automatically operate the shuttle to move up and down the cable (506), flipping the baskets at regular time periods. As noted above, this process mimics intertidal cultivation systems despite the present cultivation system operating in a sub-tidal environment.

Also apparent in FIG. 5B is the spacing provided to adjacent baskets (100) through the use of the support bracket (114) for each basket. As can be seen, each support bracket is longer than the width of the basket. This is useful for it allows the operator of the cultivation system (200) to ensure appropriate spacing between adjacent baskets and thereby minimising any contact between the baskets that may occur through, for example, wave action. Instead, any contact is at the ends of neighbouring support brackets.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A basket configured for cultivation of shellfish, wherein the basket includes a top, bottom, left and right sides, front and rear ends and wherein the basket has an elongate dimension and further includes:
   one or more fixed support brackets for a cable, wherein each support bracket is orientated along an axis substantially midway along and perpendicular to the elongate dimension of the basket, wherein the one or more support brackets define an axis of rotation disposed substantially midway along and perpendicular to the elongate dimension of the basket; and
   a buoyancy module, wherein the buoyancy module is provided on an opposing side of the basket to the one or more support brackets.

2. The basket configured for cultivation of shellfish as claimed in claim 1, wherein one or both of the front and rear ends are configured to allow access to the interior of the basket configured for cultivation of shellfish.

3. The basket configured for cultivation of shellfish as claimed in claim 1, wherein the one or more support brackets are a substantially cylindrical structure.

4. The basket configured for cultivation of shellfish as claimed in claim 1, wherein the one or more support brackets are two or more spaced apart loops.

5. The basket configured for cultivation of shellfish as claimed in claim 1, wherein the buoyancy module configured to be secured to the basket configured for cultivation of shellfish with a fastener arrangement.

6. The basket configured for cultivation of shellfish as claimed in claim 5, wherein the fastener arrangement is one or more of straps, snap-lock fittings, clips, nuts and bolts, or screws.

7. The basket configured for cultivation of shellfish as claimed in claim 6, wherein the buoyancy module is a block of closed cell foam.

8. The basket configured for cultivation of shellfish as claimed in claim 6, wherein the buoyancy module is configured as a rotationally moulded container.

9. The basket configured for cultivation of shellfish as claimed in claim 8, wherein the buoyancy module includes a cap or valves configured to permit access to an interior of the buoyancy module.

10. A system for cultivation of shellfish, the system including:
    a cable; and
    at least one basket configured for cultivation of shellfish, wherein the basket includes a top, bottom, left and right sides, front and rear ends and wherein the basket has an elongate dimension and includes one or more fixed support brackets for the cable, wherein each support bracket is orientated along an axis substantially midway along and perpendicular to the elongate dimension of the basket, wherein the one or more support brackets define an axis of rotation disposed substantially midway along and perpendicular to the elongate dimension of the basket; and wherein the basket includes a buoyancy module, wherein the buoyancy module is provided on the opposing side of the basket to the one or more support brackets.

11. The system for cultivation of shellfish as claimed in claim 10, wherein the system also includes a shuttle configured with a frame mounted to an upper surface of the shuttle, wherein the frame is configured to engage with the at least one basket.

12. The system for cultivation of shellfish as claimed in claim 10, wherein the system also includes a shuttle configured with dual hulls, wherein the shuttle also includes a guide or rail positioned between the hulls and configured to engage with the at least one basket.

13. A method, comprising:
    obtaining a system for cultivating shellfish, the system including:
        a cable; and
        at least one basket configured for cultivation of shellfish, wherein the basket includes a top, bottom, left and right sides, front and rear ends and wherein the basket has an elongate dimension and includes one or more fixed support brackets for the cable, wherein each support bracket is orientated along an axis substantially midway along and perpendicular to the elongate dimension of the basket, wherein the one or more support brackets define an axis of rotation disposed substantially midway along and perpendicular to the elongate dimension of the basket; and wherein the basket includes a buoyancy module, wherein the buoyancy module is provided on the opposing side of the basket to the one or more support brackets;
    passing a cable through each of the one or more support brackets of at least one basket; and
    immersing the basket in a marine or freshwater environment.

14. The method as claimed in claim 13, wherein the method further includes:
    raising the cable such that the basket rotates about the axis of rotation defined by the one or more support brackets.

15. The method as claimed in claim 13, wherein a plurality of shellfish are seeded in at least one basket after the action of immersing the basket in the marine or freshwater environment.

16. The basket configured for cultivation of shellfish as claimed in claim 1, wherein one or both of the front and rear ends are configured to allow access to the interior of the basket, wherein the basket is a cultivation of shellfish basket.

17. The method as claimed in claim 13, wherein the method further includes:
   raising the cable such that the basket is stationary about the axis of rotation defined by the one or more support brackets; and
   cultivating shellfish while the basket is immersed in the maritime or freshwater environment.

18. The method as claimed in claim 13, further comprising:
   flipping the basket about the axis of rotation disposed substantially midway along and perpendicular to the elongate dimension of the basket.

19. The method as claimed in claim 13, further comprising:
   taking the basket out of the water and drying the basket.

20. The basket of claim 1, wherein:
   the basket includes an axis of rotation disposed parallel to the elongate dimension of the basket.

* * * * *